(12) United States Patent
Park

(10) Patent No.: US 7,213,678 B2
(45) Date of Patent: May 8, 2007

(54) VARIABLE STEERING GEAR RATIO APPARATUS AND METHOD USING THE SAME

(75) Inventor: Soo Bo Park, Suwon (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 112 days.

(21) Appl. No.: 11/010,006

(22) Filed: Dec. 10, 2004

(65) Prior Publication Data
US 2005/0133296 A1  Jun. 23, 2005

(30) Foreign Application Priority Data
Dec. 17, 2003  (KR) .................... 10-2003-0092396

(51) Int. Cl.
B62D 5/04 (2006.01)
B62D 5/06 (2006.01)

(52) U.S. Cl. .................. 180/444; 180/446; 180/428

(58) Field of Classification Search ............. 180/428, 180/444, 446
See application file for complete search history.

(56) References Cited

U.S. PATENT DOCUMENTS 4,658,927 A * 4/1987 Kanazawa .................. 180/422

FOREIGN PATENT DOCUMENTS

JP  2002-331941  11/2002

* cited by examiner

Primary Examiner—Lesley D. Morris
Assistant Examiner—Marc A. Scharich
(74) Attorney, Agent, or Firm—Morgan Lewis & Bockius LLP

(57) ABSTRACT

The present invention provides a variable steering gear ratio apparatus adapted to adjust the steering gear ratio based on the vehicle speed and steering angle, thereby facilitating steering manipulation by applying a small steering gear ratio when the vehicle comes to a parked state, the vehicle speed is low, or the steering angle is large. By applying a large steering gear ratio when the vehicle speed is high or the steering angle is small, the steering stability of the vehicle improves.

4 Claims, 3 Drawing Sheets

VARIABLE STEERING GEAR RATIO APPARATUS AND METHOD USING THE SAME

CROSS-REFERENCE TO RELATED APPLICATIONS

The present application claims priority from Korean Application Number 10-2003-0092396, filed on Dec. 17, 2003, which is incorporated herein by reference in its entirety.

FIELD OF THE INVENTION

The present invention relates to a variable steering gear ratio apparatus whereby the rotational angle of a wheel can be varied in relation to the rotational angle of a steering wheel.

BACKGROUND OF THE INVENTION

The steering gear ratio can be evaluated by the following equation: steering gear ratio=(steering rotational angle)/(wheel rotational angle).

Generally, a vehicle steering system transmits the rotation of a steering wheel to a gear box via a steering shaft. The rotational movement of the steering wheel is converted into a linear movement of a rack and pinion in the gear box to rotate the wheel. Therefore, the rotational angle of the wheel is constantly formed in relation to the rotational angle of the steering wheel. That is, the steering gear ratio is constant in the conventional system.

SUMMARY OF THE INVENTION

An embodiment of the present invention is adapted to adjust the steering gear ratio according to the vehicle speed, steering angle and the like. When the vehicle comes to a parked state, the vehicle speed is low, or the steering wheel is turned at a large angle, a small steering gear ratio is applied. On the other hand, if the driver turns the steering wheel at a small angle or if the vehicle is moving at a high speed, then a large steering gear ratio is applied to improve the steering stability.

A variable steering gear ratio apparatus comprises a steering input shaft. A steering output shaft is parallel to the steering input shaft. A variable pulley means is equipped at the steering input shaft and the steering output shaft, respectively. A belt connects the variable pulley means. The variable steering gear ratio apparatus is also provided with a vehicle speed sensor and a steering angle sensor. A controller controls the variable pulley means by receiving signals from the vehicle speed sensor and steering angle sensor.

BRIEF DESCRIPTION OF THE DRAWINGS

For a better understanding of the nature and objects of the present invention, reference should be made to the following detailed description with the accompanying drawings, in which.

DETAILED DESCRIPTION OF THE EMBODIMENT

Figure 1:
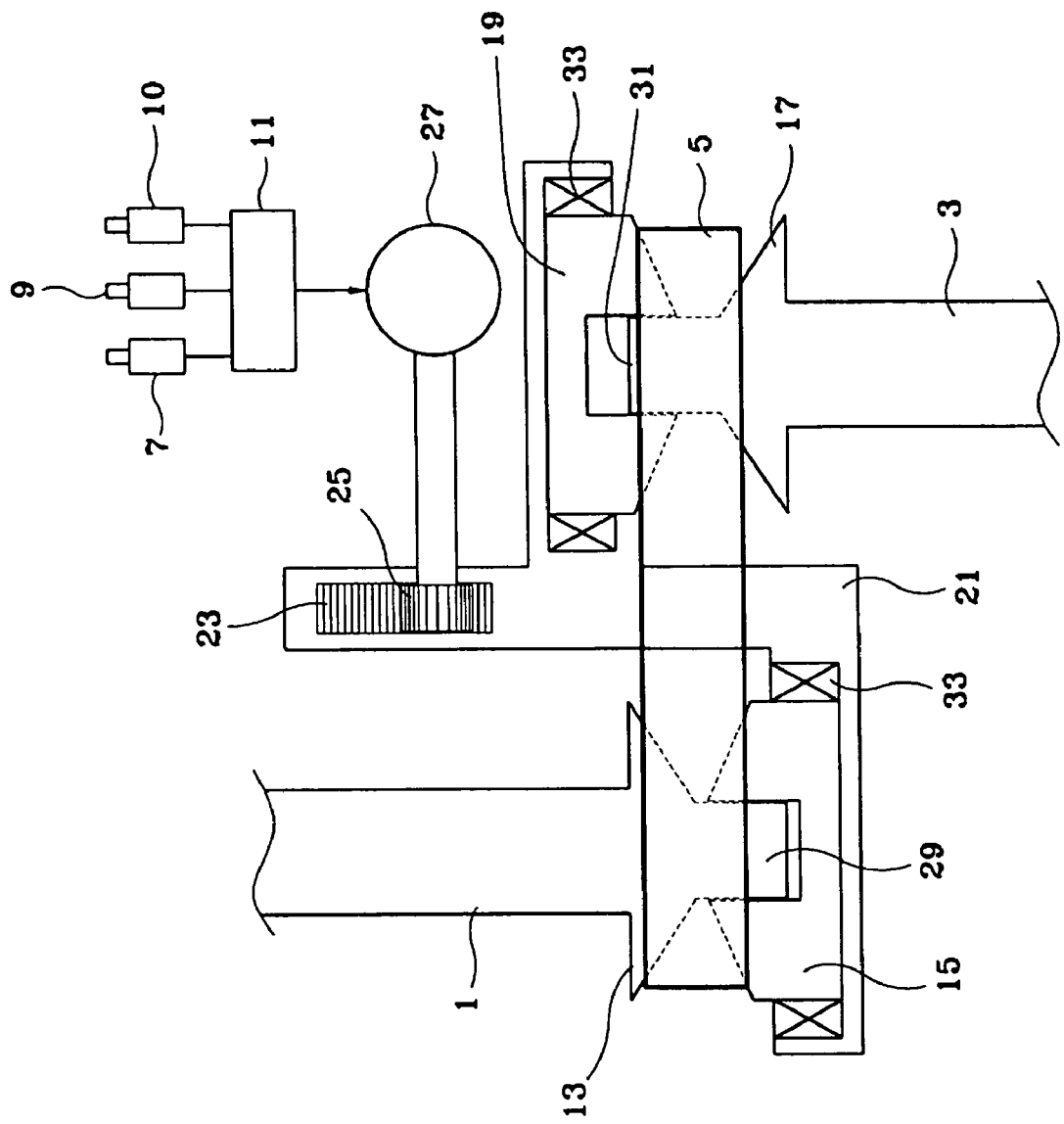
FIG. 1 illustrates a steering gear ratio variable apparatus according to an embodiment of the present invention.

Referring to FIG. 1, a steering input shaft 1 and steering output shaft 3 are disposed parallel to each other according to an embodiment of the present invention. The steering input shaft 1 and steering output shaft 3 are each equipped with a variable pulley means. The variable pulley means connect with each other via a belt 5. The variable pulley means are controlled by a controller 11 that receives signals from a vehicle speed sensor 7 and steering angle sensor 9.

The steering input shaft 1 connects directly to the steering wheel, which is manipulated by the driver, and the steering output shaft 3 connects to a gear box. Therefore, the rotational force transmitted from the steering input shaft 1 is transmitted to the wheel.

The variable pulley means according to this embodiment of the present invention comprises an input shaft fixing pulley 13 that is disposed at one end of the steering input shaft 1. An input shaft movable pulley 15, which is capable of sliding, is linearly installed along the shaft direction of the steering input shaft 1 in relation to the input shaft fixing pulley 13. An output shaft fixing pulley 17 is disposed at one end of the steering output shaft 3 in the opposite direction of the input shaft fixing pulley 13. An output shaft movable pulley 19, which is capable of sliding, is linearly installed along the shaft direction of the steering output shaft 3 in relation to the output shaft fixing pulley 17. A variable rod 21 integrally connects the input shaft movable pulley 15 and output shaft movable pulley 19. A linear moving means linearly moves the variable rod 21 along the shaft direction of the steering input shaft 1 by receiving the control from the controller 11.

The linear moving means includes a rack 23 disposed on the variable rod 21, and a driving gear 25 meshing with the rack 23. A motor 27, which is controlled by the controller 11, rotates the driving gear 25.

The end of the input shaft fixing pulley 13 of the steering input shaft 1 is equipped with an input pulley guide 29 that guides the linear movement of the input shaft movable pulley 15. The end of the output shaft fixing pulley 17 of the steering output shaft 3 is equipped with an output pulley guide 31 that guides the linear movement of the output shaft movable pulley 19. Therefore, the input shaft movable pulley 15 linearly moves along the input pulley guide 29, and the output shaft movable pulley 19 linearly moves along the output pulley guide 31.

As the input shaft movable pulley 15 and output shaft movable pulley 19 are fixed to the variable rod 21 by bearings 33, the input shaft movable pulley 15 and output shaft movable pulley 19 can naturally rotate in relation to the variable rod 21.

The operation of the present invention will now be described in detail.

When the vehicle is moving at a low speed, e.g., comes to a parked state or the like, or when the driver turns the steering wheel at a large angle, the controller 11 determines whether the vehicle is moving at a low speed and what the driver's intention for manipulating the steering wheel is by receiving signals from the vehicle speed sensor 7 and the steering angle sensor 9.

If the controller 11 determines that the vehicle speed is low or steering angle is large, then the controller 11 linearly shifts the variable rod 21 via the motor 27 to thereby dispose the input shaft movable pulley 15 and output shaft movable pulley 19 as illustrated in FIG. 1.

Figure 3:
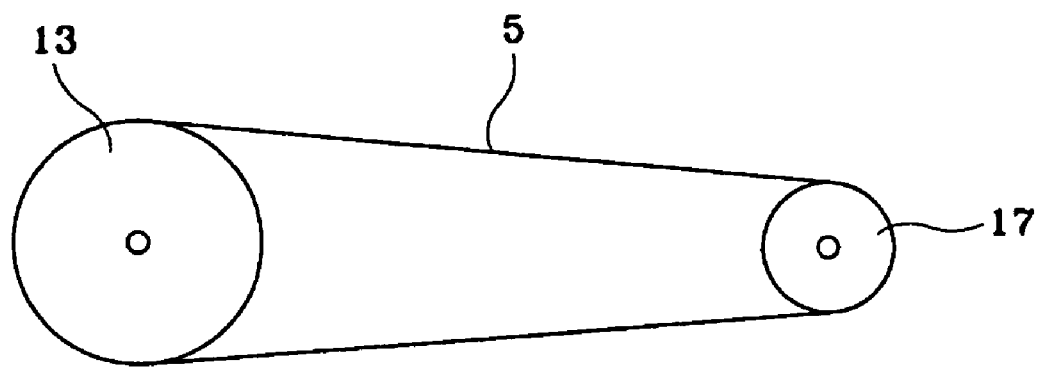
FIG. 3 illustrates the relationship between a steering input shaft and a steering output shaft in the state of FIG. 1.

The embodiment in FIG. 1 provides a pulley ratio as illustrated in FIG. 3, and thus the wheel rotates at a large angle even if the driver turns the steering wheel at a small angle. That is, a small steering gear ratio is formed.

Accordingly, the driver can easily control the vehicle by making a small rotational movement on the steering wheel if the vehicle comes to a parked state or the like.

Figure 2:
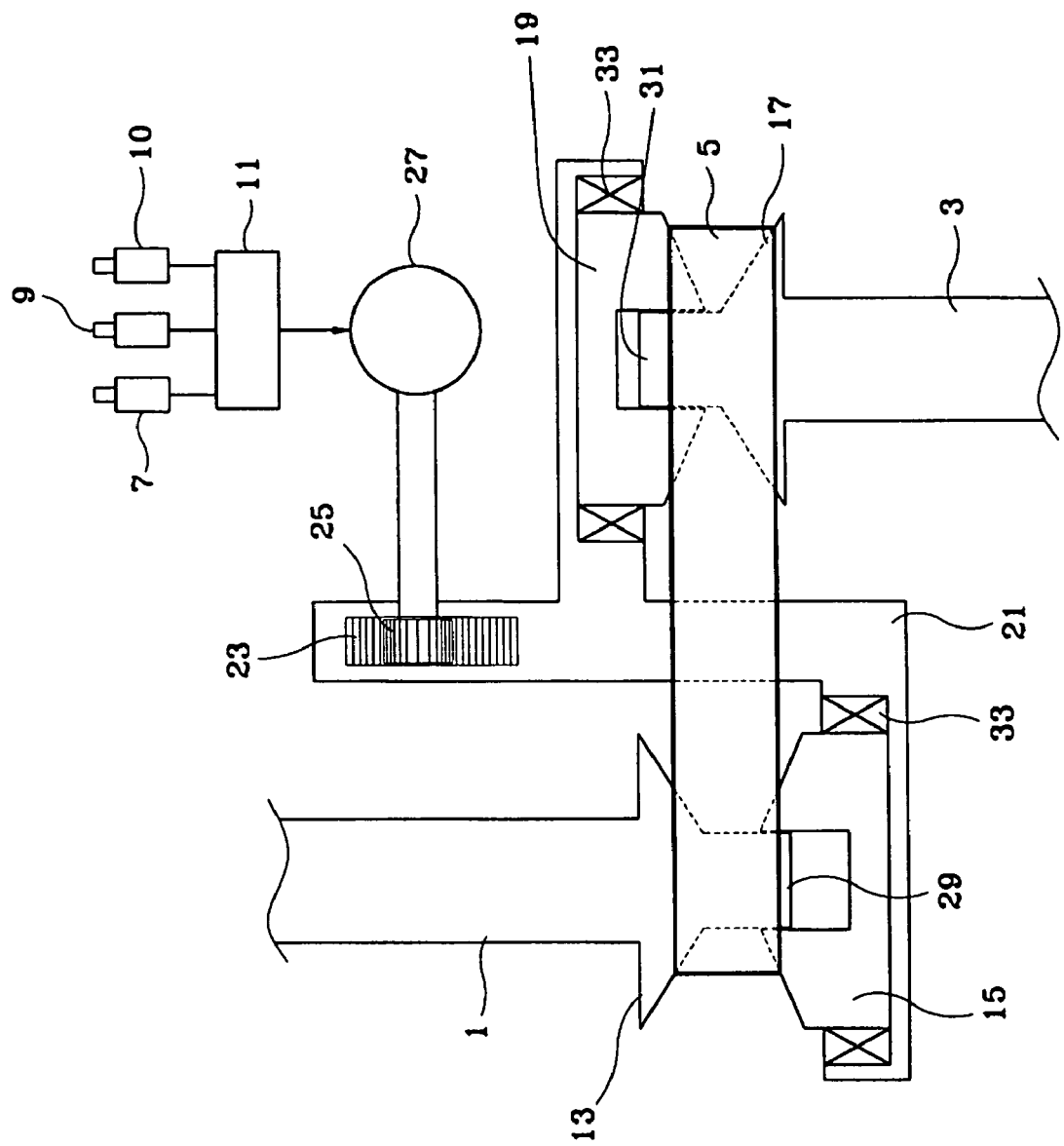
FIG. 2 illustrates an operation of a steering gear ratio variable apparatus in comparison to FIG. 1.
Figure 4:
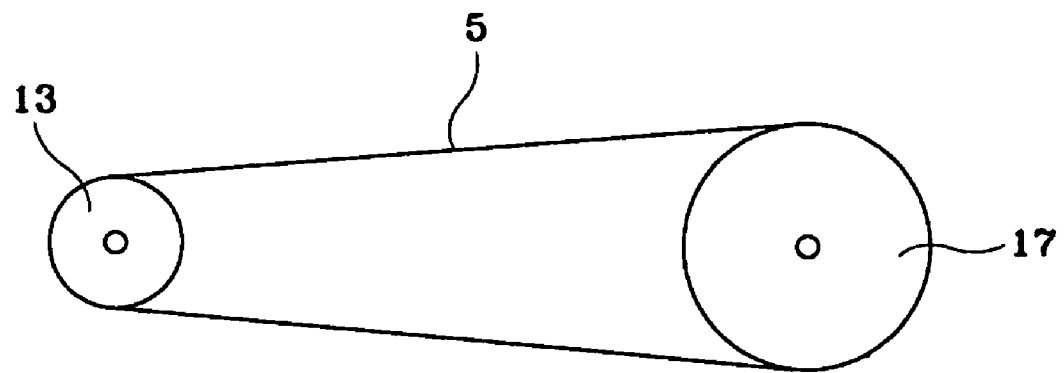
FIG. 4 illustrates the relationship between a steering input shaft and a steering output shaft in the state of FIG. 2.

On the other hand, if the vehicle speed is high or if a small steering angle is established, the controller 11 manipulates the variable rod 21, according to the embodiment shown in FIG. 2, by receiving signals from the vehicle speed sensor 7 and steering angle sensor 9. This allows the pulley ratio between the steering input shaft 1 and steering output shaft 3 to be shown as in FIG. 4. That is, a large steering gear ratio is formed.

When a large steering gear ratio is formed, the pivoting angle of the wheel becomes smaller in comparison to the rotational angle of the steering wheel that is manipulated by the driver, thereby preventing rapid steering movements and improving the forward driving stability and steering safety of the vehicle.

Provided that the vehicle is moving at a low or medium speed or the steering angle is between the above-mentioned large and small degree, the controller 11 manipulates the variable rod 21 to control the pulley ratio between the steering input shaft 1 and steering output shaft 3 to be preferably less than or equal to 1, thereby obtaining a rapid steering efficiency.

The controller 11 also receives a yaw rate from a yaw rate sensor 10 or similar device so that the controller can adjust the steering gear ratio in case of a slippery road or the like, thus improving the steering safety of the vehicle.

As apparent from the foregoing, there is an advantage in that the steering gear ratio can be changed based on the vehicle speed and steering angle, thereby facilitating steering manipulation by applying a small steering gear ratio when the vehicle comes to a parked state, such as when the vehicle speed is low or the steering angle is large. Further, when the vehicle is moving at a high speed or when the driver turns the steering wheel at a small angle, a large steering gear ratio is applied, thus improving the steering safety of the vehicle.

While the foregoing description represents various embodiments of the present invention, it will be appreciated that the foregoing description should not be deemed limiting since additions, variations, modifications and substitutions may be made without departing from the spirit and scope of the present invention. It will be clear to one of skill in the art that the present invention may be embodied in other forms, structures, arrangements, and proportions and may use other elements, materials and components. The present disclosed embodiments are, therefore, to be considered in all respects as illustrative and not restrictive, the scope of the invention being indicated by the appended claims and not limited to the foregoing description.

What is claimed is:

1. A variable steering gear ratio apparatus, comprising:
   a steering input shaft;
   a steering output shaft disposed parallel to said steering input shaft;
   a variable pulley means equipped at said steering input shaft and said steering output shaft, respectively;
   a belt connecting said variable pulley means;
   a vehicle speed sensor;
   a steering angle sensor; and
   a controller controlling said variable pulley means by receiving signals from said vehicle speed sensor and said steering angle sensor;
   wherein said variable pulley means comprises;
      an input shaft fixing pulley formed at one end of said steering input shaft;
      an input shaft movable pulley linearly installed along the shaft direction of said steering input shaft in relation to said input shaft fixing pulley, wherein said input shaft movable pulley is capable of sliding;
      an output shaft fixing pulley formed at one end of said steering output shaft in the opposite direction to said input shaft fixing pulley;
      an output shaft movable pulley linearly installed along the shaft direction of said steering output shaft in relation to said output shaft fixing pulley, wherein said input shaft movable pulley is capable of sliding;
      a variable rod integrally connecting said input shaft movable pulley and output shaft movable pulley; and
      a linear moving means that linearly moves said variable rod along the shaft direction of said steering input shaft by receiving the control from said controller.

2. The apparatus of claim 1, wherein said linear moving means includes:
   a rack disposed on said variable rod;
   a driving gear meshing with said rack; and
   a motor rotating said driving gear by being controlled by said controller.

3. The apparatus of claim 1, wherein said end of said input shaft fixing pulley of said steering input shaft is equipped with an input pulley guide that guides a linear movement of said input shaft movable pulley, and said end of said output shaft fixing pulley of said steering output shaft is equipped with an output pulley guide that guides a linear movement of said output shaft movable pulley.

4. The apparatus of claim 3, wherein said input shaft movable pulley and said output shaft movable pulley are fixed to said variable rod by bearings.

* * * * *